(12) United States Patent
Smith

(10) Patent No.: US 7,517,120 B2
(45) Date of Patent: Apr. 14, 2009

(54) MOUNTING FOOT ASSEMBLY FOR LIGHTBAR

(75) Inventor: Kevin M. Smith, Chester, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 17 days.

(21) Appl. No.: 11/637,271

(22) Filed: Dec. 12, 2006

(65) Prior Publication Data

US 2008/0137356 A1 Jun. 12, 2008

(51) Int. Cl.
*B60Q 1/26* (2006.01)
(52) U.S. Cl. .................................. 362/493; 362/487
(58) Field of Classification Search .................. 362/493, 362/486; 340/472, 474, 473
See application file for complete search history.

(56) References Cited

U.S. PATENT DOCUMENTS

| | | | |
|---|---|---|---|
| 4,588,118 A | 5/1986 | Ferenc et al. ............... 224/331 |
| 5,027,260 A | 6/1991 | Lyons et al. ................. 362/74 |
| 5,091,828 A * | 2/1992 | Jincks et al. ................ 362/542 |
| 5,884,997 A * | 3/1999 | Stanuch et al. ............. 362/493 |
| 6,140,918 A * | 10/2000 | Green et al. ................ 340/468 |
| 6,623,151 B2 * | 9/2003 | Pederson .................... 362/542 |
| 6,722,776 B1 | 4/2004 | Lyons et al. ................ 362/493 |
| 6,845,893 B2 | 1/2005 | Nelson ....................... 224/322 |
| 7,244,053 B2 * | 7/2007 | Bader et al. ................ 362/493 |

\* cited by examiner

*Primary Examiner*—Anabel M Ton
(74) *Attorney, Agent, or Firm*—Alix, Yale & Ristas, LLP

(57) ABSTRACT

A mounting foot assembly including a base member with a front wall having a front surface and a foot member with a rear wall having a rear surface. The foot member is adjustably secured to the base member with the rear surface of the rear wall being in facing relationship with the front surface of the front wall of the base member, whereby the angular position of the base member relative to the foot member may be varied. A bracket may be mounted on the foot assembly having a rear crossbar portion adapted to be positioned in a cross channel in the base member and a forward portion extending down in front of the rear wall of the foot member to which a light unit may be attached.

19 Claims, 8 Drawing Sheets

MOUNTING FOOT ASSEMBLY FOR LIGHTBAR

BACKGROUND OF INVENTION

1. Technical Field

This disclosure relates generally to mounting hardware for securing warning light arrays to motor vehicles, and more particularly, to a mounting foot assembly for securing a lightbar to the roof of a motor vehicle.

2. Background

Lighting systems for mounting on the exterior of police and other public service vehicles have long been known in the art. Exterior mounting of such lighting systems is generally preferred in order to enhance the visibility thereof, i.e., a warning light mounted above the roof of an emergency vehicle may be more readily seen than a light mounted below the vehicle roof line or within the vehicle. Such exterior mounting also affords the possibility of the emitted light being seen from any direction and minimizes the possibility that the light produced by the lighting system will interfere with the vision of the vehicle operator.

A long-standing problem associated with lightbar assemblies resides in mounting the assembly to the vehicle in such a manner that it may be easily positioned as desired on the vehicle and, most importantly, will not become loose due to vibration or other causes and either change position or become dislodged. There are, of course, many mounting assemblies known in the prior art for attaching devices to the roof of a motor vehicle. U.S. Pat. No. 4,588,118 (hereinafter the '118 patent), assigned to the assignee of the present invention, discloses a mounting foot assembly for securing a lightbar to the exterior of a motor vehicle. Specifically, the mounting foot assembly includes a mounting member foot portion and gutter clamp which supports the mounting member in clamped relationship to a rain gutter of the motor vehicle. An upwardly projecting portion of the mounting member has laterally projecting tabs for engagement with inwardly facing longitudinal slots defined by an I-beam extruded aluminum strength member. The mounting foot assembly includes locking cams configured to extend outwardly to engage the bottom of the longitudinal slots. When secured in their engaged position, the locking cams secure respective of the mounting members to the I-beam and urge the corresponding gutter clamp inwardly to secure the mounting foot assembly to the gutters at the opposite sides of the vehicle.

While the lightbar mounting foot assembly disclosed in the '118 patent has been commercially successful and provided a secure engagement between the lightbar and the motor vehicle, further improvements in lightbar mounting are possible. For example, modern motor vehicle design has eliminated the outwardly projecting rain gutter and thus a convenient clamping location. Further, reinforced plastic materials may be used to form a mounting foot having improved efficiency of manufacture and aesthetic appearance. These changes result in the need for a new and effective mounting foot assembly that is compatible with modern vehicle configurations and mounting foot materials.

The lightbar disclosed in the '118 patent, as well as that disclosed in U.S. Pat. No. 5,027,260 (hereinafter the '260 patent), also assigned to the assignee of the present invention, are constructed around a longitudinally extending extruded aluminum strength member. This strength member may be in the form of an I-beam as shown in the '118 patent, a concave channel as shown in the '260 patent, or the like. Extrusion is an efficient method for obtaining a strength member of high rigidity having a complex sectional configuration. Longitudinally extending features are arranged for the mounting of lightheads, internal components such as power supplies to the interior of the extrusion and exterior components such as lenses to the exterior of the extrusion.

Typically, components are engaged with longitudinal features defined by the extrusion and slid along the length of the extrusion into a desired position where they are secured in place by set screws bearing against the extrusion. Brackets or mounting feet for a lightbar have been fixed to the bottom exterior surface of the lightbar strength member in a similar manner. Lightbars are typically assembled according to a customer's specification and shipped to the customer for installation on a motor vehicle. In a fully assembled lightbar, end caps may cover entry openings for all of the longitudinally extending features, including the inwardly facing slots configured to receive the upper portions of mounting brackets or mounting feet. In such a lightbar, the feet must be mounted to the lightbar prior to installation of the end caps or the lightbar must be partially disassembled by the end user to accommodate mounting of the support foot or mounting bracket. Shipping a lightbar with the mounting feet attached increases the cost of shipping and also increases the likelihood of breakage during shipment. End user disassembly and re-assembly of lightbar components to the extrusion complicates lightbar installation.

U.S. Pat. No. 6,845,893, the disclosure of which is incorporated herein by reference in its entirety, discloses a light bar mounting foot that is compatible with an extruded light bar strength member and which does not require disassembly of the light bar for mounting. The patent discloses various features of attaching and locking the mounting foot to the light bar strength member.

In recent years the roof line of some models of vehicles have changed in appearance in that the roof has incorporated more longitudinal curvature over its length. To the extent that the roof line slopes in a longitudinal direction either upwardly or downwardly in the area in which a light bar is to be installed, with a fixed mounting foot, the lights on the light bar will tend to be aimed incorrectly, either too high or too low.

In some instances, a light unit, such as an alley light, may be attached to the ends of the lightbar. Such light units commonly utilize halogen bulbs as the light source, and heat from the halogen bulb may build up within the lightbar unit itself.

There is a need for a mounting foot for a lightbar which is compatible with the light bar strength member, which is easily assembled, and which can provide for variations is the longitudinal slope of the vehicle roof. Additionally, there is a need for an arrangement by which a light unit may be supported by the mounting foot to provide a side light, thereby eliminating the need to mount a light unit of the type that generates a large amount of heat within the lightbar itself.

SUMMARY

According to one aspect, a mounting foot assembly may be provided for supporting an elongate member having spaced parallel channels therein, each said channel defining a slot, said slots of said channel being in facing relationship. The mounting foot assembly may comprise a base member including a support platform and a front wall with a front surface extending downward from said platform, the support platform having tabs thereon adapted to be received in the slots. A foot member may be included which includes a base portion and a rear wall with a rear surface extending upwardly from said base portion, said foot member being adjustably secured to said base member with said rear surface of the rear wall of the foot member being in facing relationship with the front surface of the front wall of the base portion whereby the angular position of said foot member about an longitudinal axis of the mounting foot assembly may be varied relative to the base member.

According to another aspect, a mounting foot assembly may be provided for supporting an elongate member having spaced parallel channels therein, each said channel defining a slot, said slots of said channel being in facing relationship. The mounting foot assembly may comprise a base member including a support platform and a front wall with a front surface extending downward from said platform, said support platform having tabs thereon adapted to be received in said slots. A foot member may be included which includes a base portion and a rear wall with a rear surface extending upwardly from said base portion, said foot member being secured to said base member with said rear surface of said rear wall of said foot member being in facing relationship with said front surface of said front wall of said base portion. A bracket may also be included having a first portion received within a cross channel in the upper surface of said support platform, a second portion extending forwardly to the to the front wall of said foot member, and at least one down turned flange extending downwardly from said second portion in front of said rear wall of said foot member and adapted for having a light assembly attached thereto.

BRIEF DESCRIPTION OF THE DRAWINGS

The various objects and advantages may be better understood by reference to the following detailed description and the accompany drawings in which.

DETAILED DESCRIPTION

Figure 1:
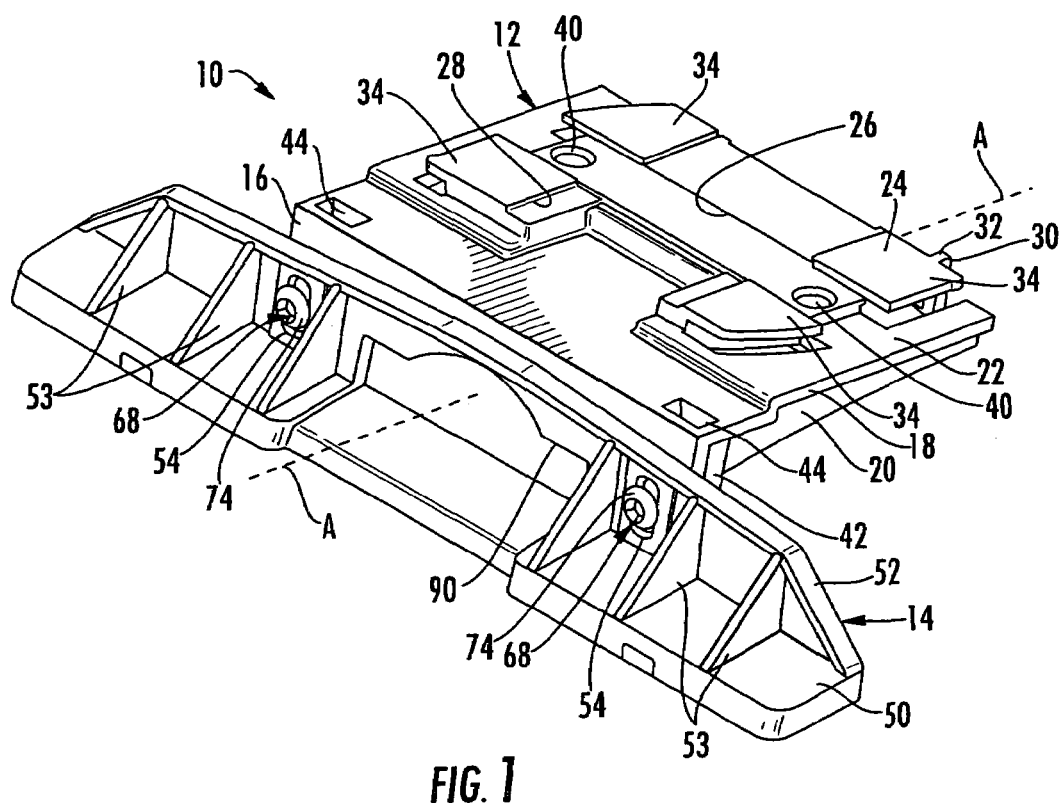
FIG. 1 is a perspective view of a mounting foot assembly for a light bar.
Figure 2:
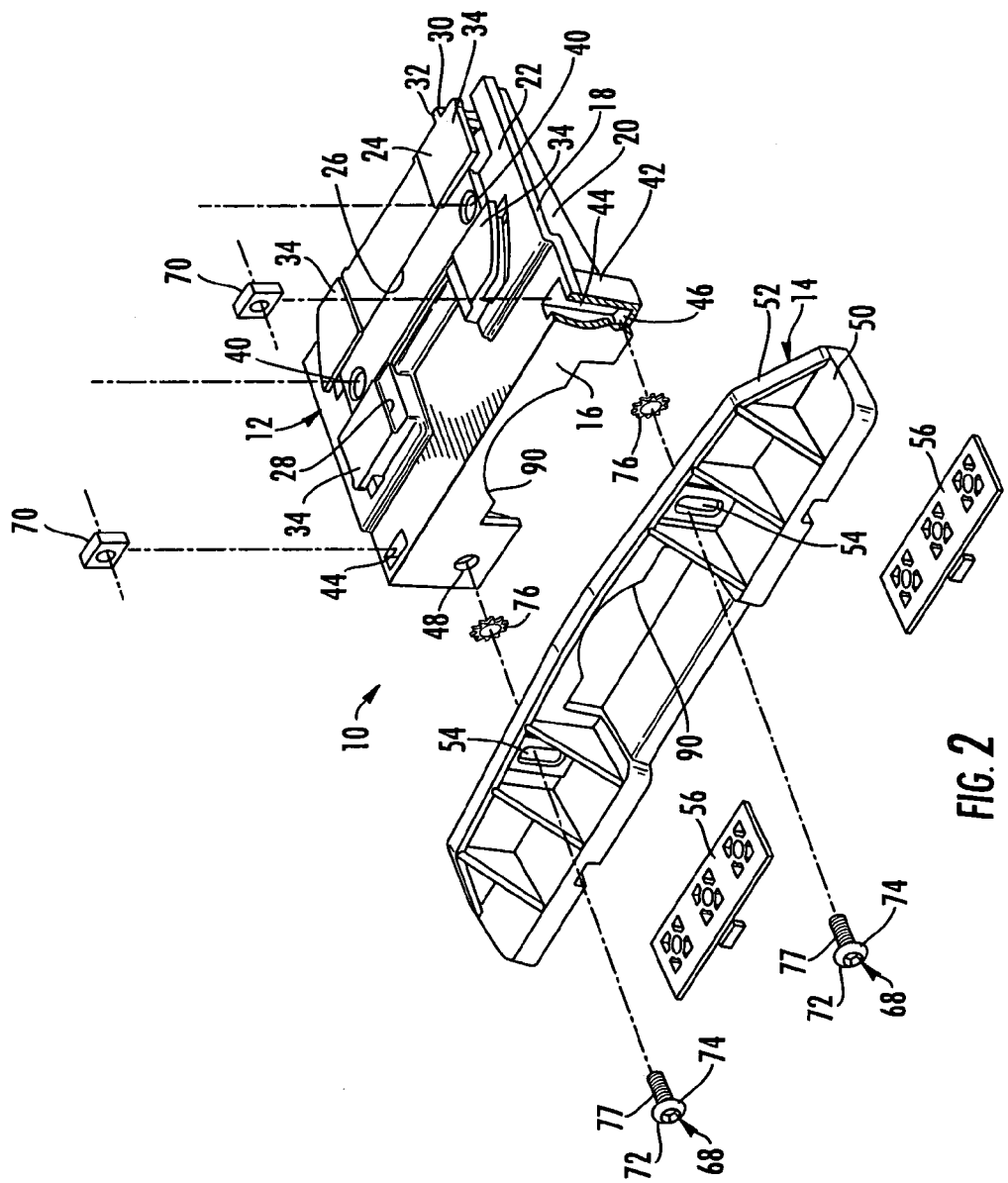
FIG. 2 is an exploded perspective view of the mounting foot assembly of FIG. 1.
Figure 3:
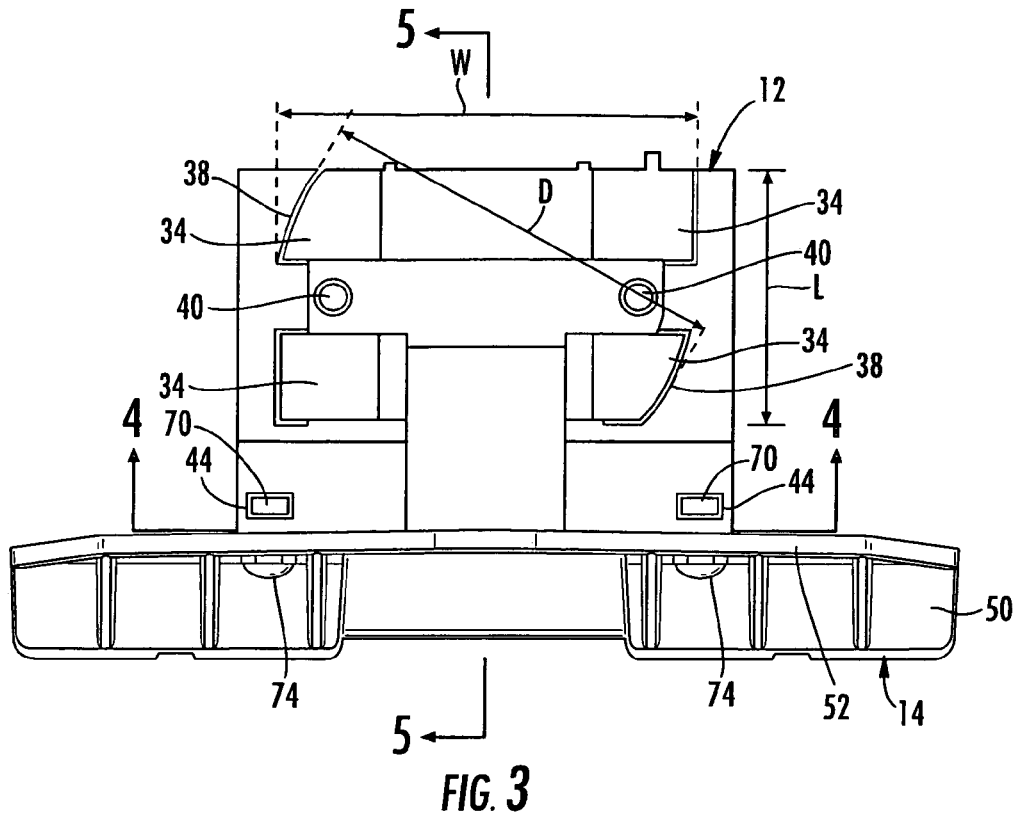
FIG. 3 is a top plan view of the mounting foot assembly of FIG. 1.

Referring to the drawings, and particularly FIGS. 1 and 2, the mounting foot assembly 10 includes a base 12 and a foot member 14 attached to the front of the base 12. The base 12 and foot member are each unitary members preferably molded from a fiber reinforced plastic or other suitable plastic. The base 12 includes a front planar wall 16 connected at a right angle to a support platform 18 and extending downwardly therefrom. Reinforcing ribs 20 may be provided between the front wall 16 and the support platform 18.

The support platform 18 includes a first raised planar section 22 and a second upper raised planar section 24 that is spaced above the first section 22. A recessed cross channel 26 extends across the second raised section 24 in a direction perpendicular to the longitudinal axis "A" of the foot assembly 10. A longitudinal channel 28, of less depth than the channel 26, is provided in the upper raised section 24 midway between the side edges and extends parallel to the axis "A" of the mounting foot assembly 10. A projection 30 extends from the rear of the support platform 18 rearward therefrom and has its upper surface 32 coplanar with the upper surface of the second raised section 24.

Figure 4:
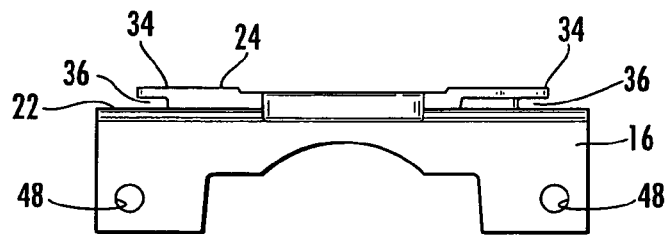
FIG. 4 is a sectional view taken along the lines 4-4 of FIG. 3.

The upper raised section 24 defines four lateral tabs 34, two on either side of the raised section 24. The tabs 34 define slots 36 (best shown in FIG. 4) on either side of the support platform 18 between the lower surface of the tabs 34 and the upper surface of the planar section 22. The upper planar section 24 is generally rectangular in configuration (W by L) with the width "W" measured at the lateral extremity of the tabs 34, and the length "L" measured from axially from front to back, excluding the projection. Diagonally opposite corners 38 of the raised section 24 has the edges of the tabs 34 rounded, with the curvature of the rounding defined by a circle of diameter D equal to the width W of the support platform.

The base includes two bores 40 though the support platform 18. Each bore 40 is positioned in the cross channel 26 midway between the spaced tabs 34 on a respective side of the platform 18. Additionally, the base 12 includes vertically extending ribs 42, one extending along each lateral edge of the front wall 16 on the rear surface thereof. Each rib 42 defines a channel 44 therein extending downwardly from the top surface of supporting platform 18 to a point short of the bottom edge of the front wall 16 forming a pocket 46. Bores 48 are provided through the front wall 16 of the base 12, with each bore 48 extending though the front wall 16 and a respective rib 42 in communication with the channel 44 therein at a point near the bottom of the pocket 46.

Figure 5:
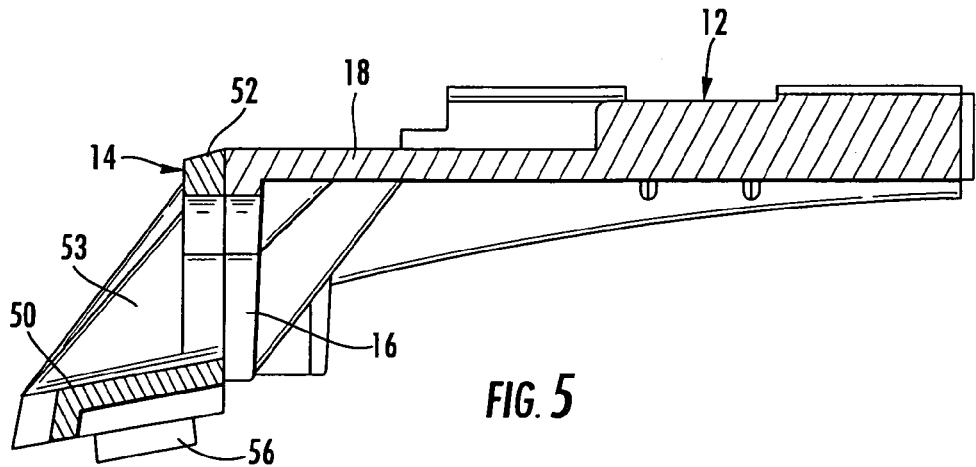
FIG. 5 is a sectional view taken along the lines 5-5 of FIG. 3.

The foot member 14 includes a base portion 50 and a rear wall 52 extending upwardly from the base portion 50. A plurality of reinforcing ribs 53 extend between the base portion 50 and rear wall 52. As shown in FIG. 5, the base portion 50 is not perpendicular to the rear wall 52 when viewed in section. Rather, the angle is slightly greater than 90° to provide for the curvature of the vehicle roof when installed. Two spaced vertically elongated slots 54 are provided through the rear wall 52 and are positioned to align with a respective bore 48 in the front wall 16 of the base 12.

Figure 6:
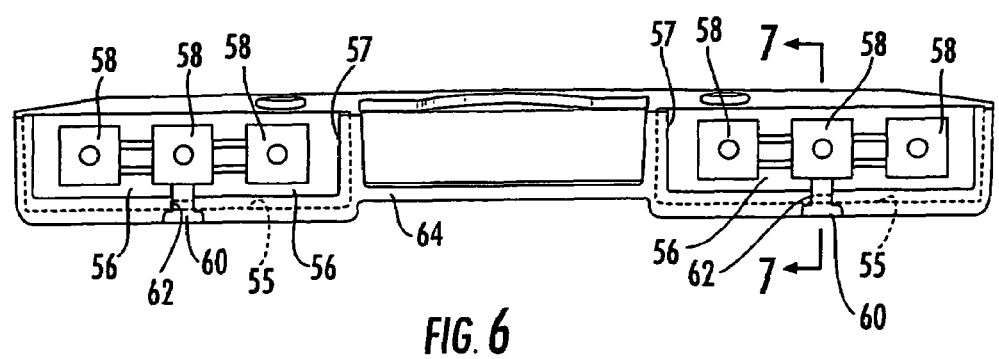
FIG. 6 is a plan view looking upwardly at the bottom of the foot member of the mounting foot assembly.
Figure 7:
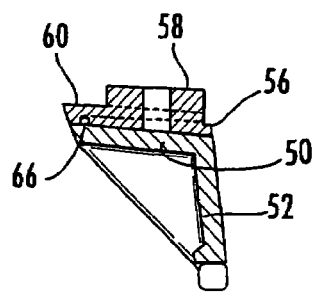
FIG. 7 is a sectional view taken along the lines 7-7 of FIG. 6.
Figure 8:
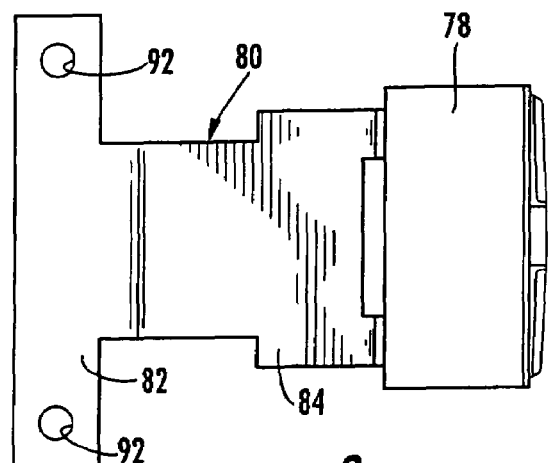
FIG. 8 is a top plan view of a light assembly and bracket that may be used with the mounting foot assembly of FIG. 1.
Figure 9:
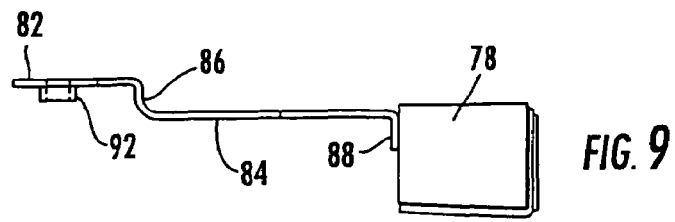
FIG. 9 is a side view of the light assembly and bracket of FIG. 8.
Figure 10:
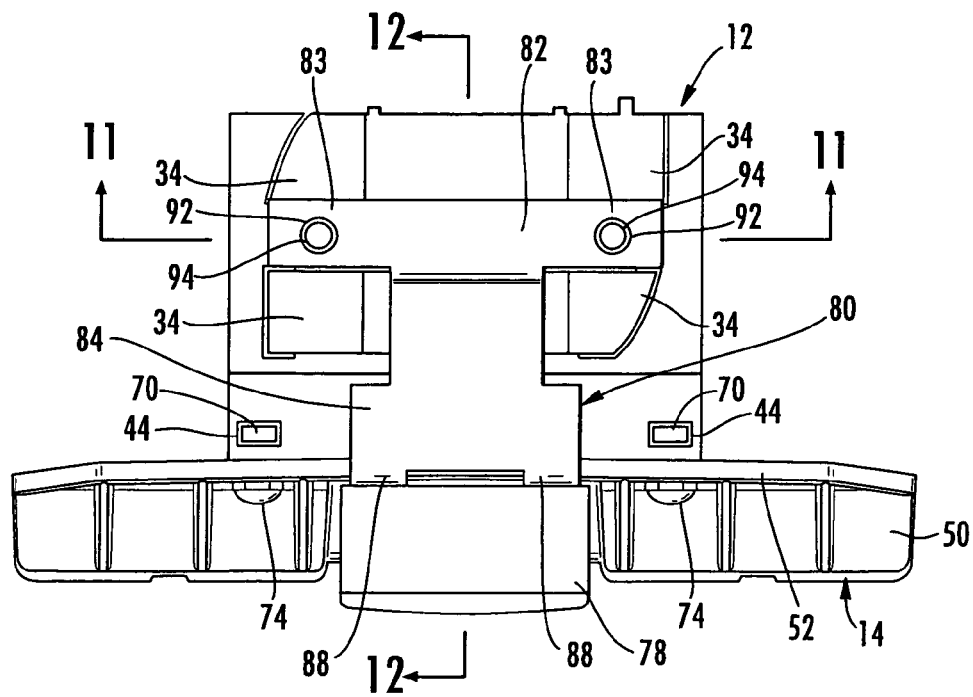
FIG. 10 is a top plan view of the mounting foot assembly of FIG. 1 with the light assembly and bracket of FIG. 8 attached.
Figure 11:
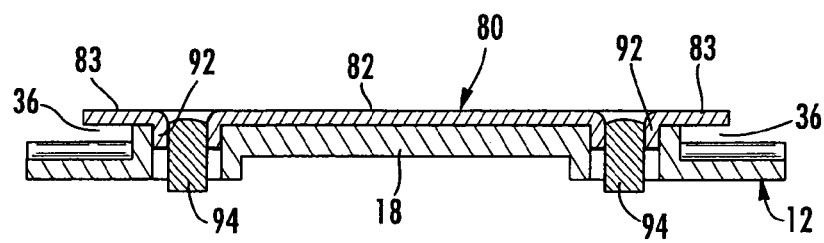
FIG. 11 is a sectional view taken along the lines 11-11 of FIG. 10.
Figure 12:
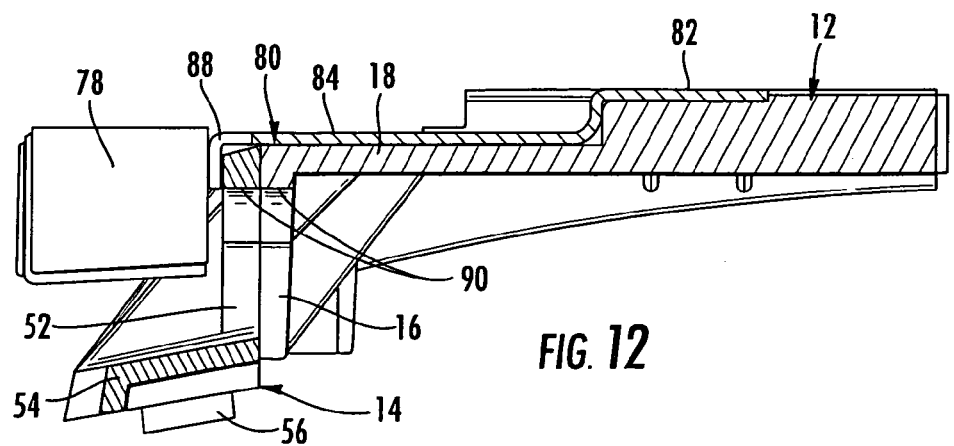
FIG. 12 is a sectional view taken along the lines 12-12 of FIG. 10.

Referring especially to FIG. 6, the underside of the base portion 50 of the foot member 14 is provided with two transversely spaced U-shaped slots 55 extending inwardly from the rear edge of the base portion 50 and surrounding an open recess 57. A generally rectangular foot pad 56, of a resilient material such as rubber or the like, is received within each of the slots 54 and includes a plurality of raised pad sections 58. A T-shaped tongue 60 extends forwardly from each of the foot pads 56 and is received in a corresponding T-shaped cutout 62 in the bottom 64 of the base portion 50 of the foot member 14 to secure the foot pads 56 in their respective cutouts 62. Each T-shaped cutout 62 is provided with a projection 66 as shown in FIG. 7 which extends into a slot in the bottom of the T-shaped tongue 60 of the foot pad 56 to help retain the foot pad 56 in the foot member 14.

The foot member 14 is attached to the base 12 by means of suitable fasteners 68 passing through the elongated slots 54 in the rear wall 52 of the foot member 14 and the bores 48 in the front wall 16 of the base 12. More specifically, the foot member 14 has the rear surface of its rear wall 52 facing and positioned against the front surface of the front wall 16 of the base 12 with the elongated slots 54 in the foot member 14 aligned with the bores 48 in the front wall 16 of the base 12. A nut 70 is positioned in each of the pockets 46 formed by the channels 44 in the ribs 42 on the base 12. A suitable bolt member 72 may extend through each of the elongated slot 54 in the rear wall 52 of the foot member 14, through a respective bore 46 in the front wall 16 of the base 12 and into threaded engagement with the nut 70 in the rib 42 on the base 12. The head 74 of the bolt 72 may seat against the forward surface of the rear wall 52 of the foot member 14 in the area surrounding the elongated slot 54. A lock washer 76, such as a star washer or the like, may be positioned on the bolt 72 between the rear surface of the rear wall 52 of the foot member 14 and the front surface of the front wall 16 of the base 12 to help prevent movement of the foot member 14 relative to the base 12 after the bolts 72 are tightened. The channel 44 in the rib 42 on the base 12 is so configured that the nut 70 positioned therein has its face parallel to the plane of the front wall 16 and the nut 70 is constrained from rotation by the side walls of the channel 44. The width of each slot 54 in the rear wall of the foot member 14 should be greater than the diameter of the shank 77 of the bolt 72 so that the base 12 and foot member 14 may have some rotational movement relative to each other about the longitudinal axis "A" of the mounting foot assembly 10.

Referring to FIGS. 8-12, an alley light 78 may be mounted on the mounting foot assembly 10 by means of a bracket 80. The bracket 80 has a shape which conforms to the contour of the top surface of the base 12. The bracket 80 is generally T-shaped and includes a rear crossbar portion 82 located within the cross channel 26 in the top surface of the raised section 24 of the support platform 18 of the base 12. The upper surface of the crossbar portion 82 is substantially flush with the upper surfaces of the tabs 34. Additionally, the lateral ends 83 of the crossbar portion 82 extend between the two tabs 34 over the slot 36.

The bracket 80 includes a lower forwardly extending portion 84 connected to the crossbar portion 82 by a vertical extending portion 86. The forwardly extending portion 84 lies on the upper surface of the support platform 18 of the base 12 as shown. At its forward end, the bracket 80 includes two laterally spaced down turned mounting flanges 88 which extend downwardly in front of the front surface of the rear wall 52 of the foot member 14. An appropriate alley light 78 may be attached by suitable fasteners (not shown) such as nuts and bolts to the mounting flanges 88. The rear wall 52 of the foot member 14 and the front wall 16 of the base 12 have suitable cutouts 90 therein that provide a passage for electrical connections to the alley light 78 if necessary.

The crossbar portion 82 of the bracket 80 includes two spaced downwardly extending internally threaded bosses 92. When the bracket 80 is mounted on the foot assembly 10, the bosses 92 are received in a respective bore 40 through support platform 18. A set screw 94 is provided in the each of the bosses 92.

Figure 13:
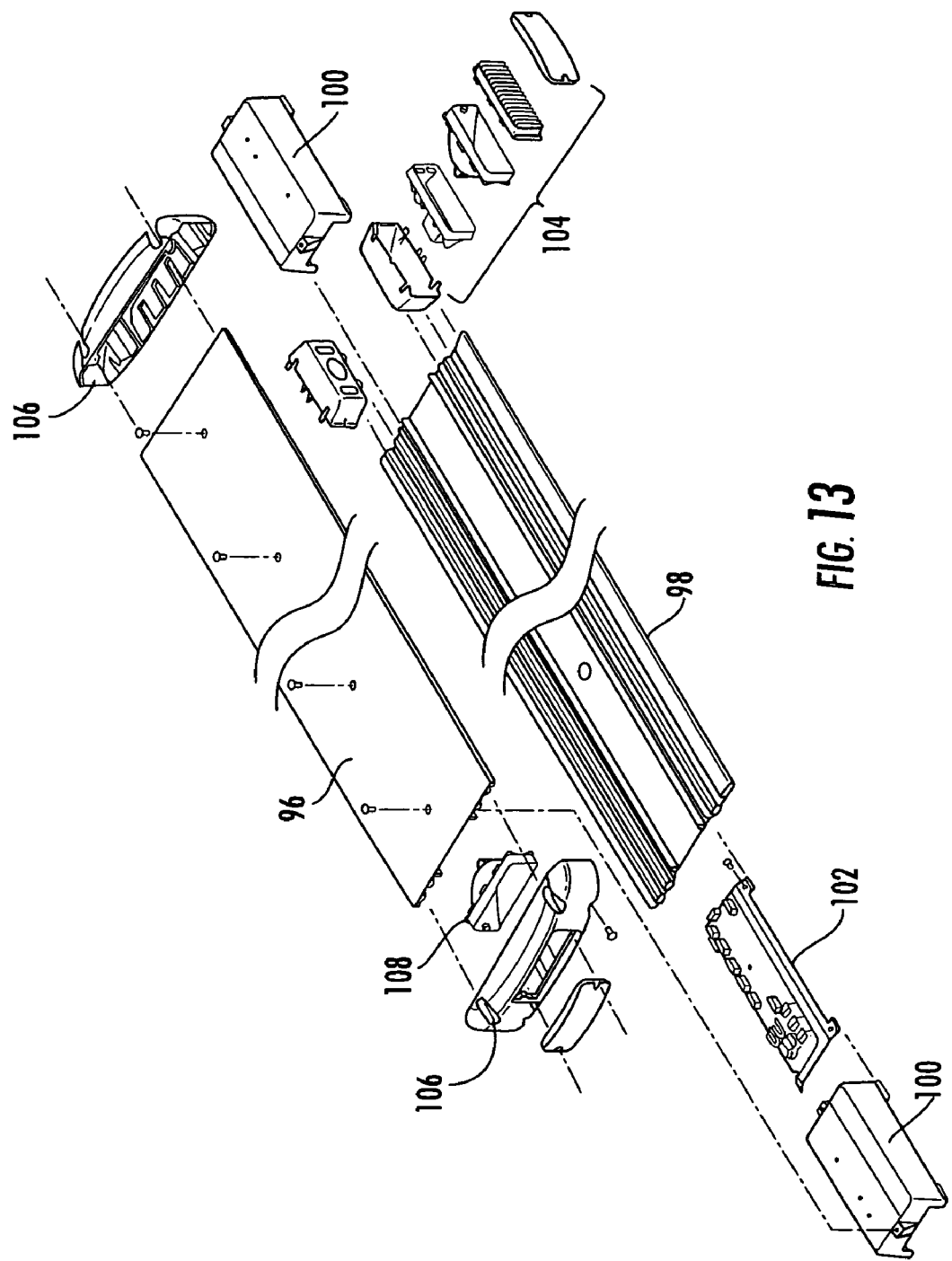
FIG. 13 is an exploded perspective view of a representative lightbar that may be secured to a vehicle using the mounting foot assembly of FIG. 1.

FIG. 13 illustrates a lightbar with which the mounting foot assembly 10 may be used. Various components are mounted to upper and lower extruded members 96, 98. Each of the extruded members 96, 98 defines longitudinally extending features that provide locations for securing various internal and external components of the lightbar. Power supplies 100, an I/O board 102 and various light assemblies 104 are slidably received in the longitudinally extending features and are fixed in place by screws engaging the extruded member. End caps 106 support a light unit 108 and enclose the longitudinal ends of the assembled lightbar.

Figure 14:
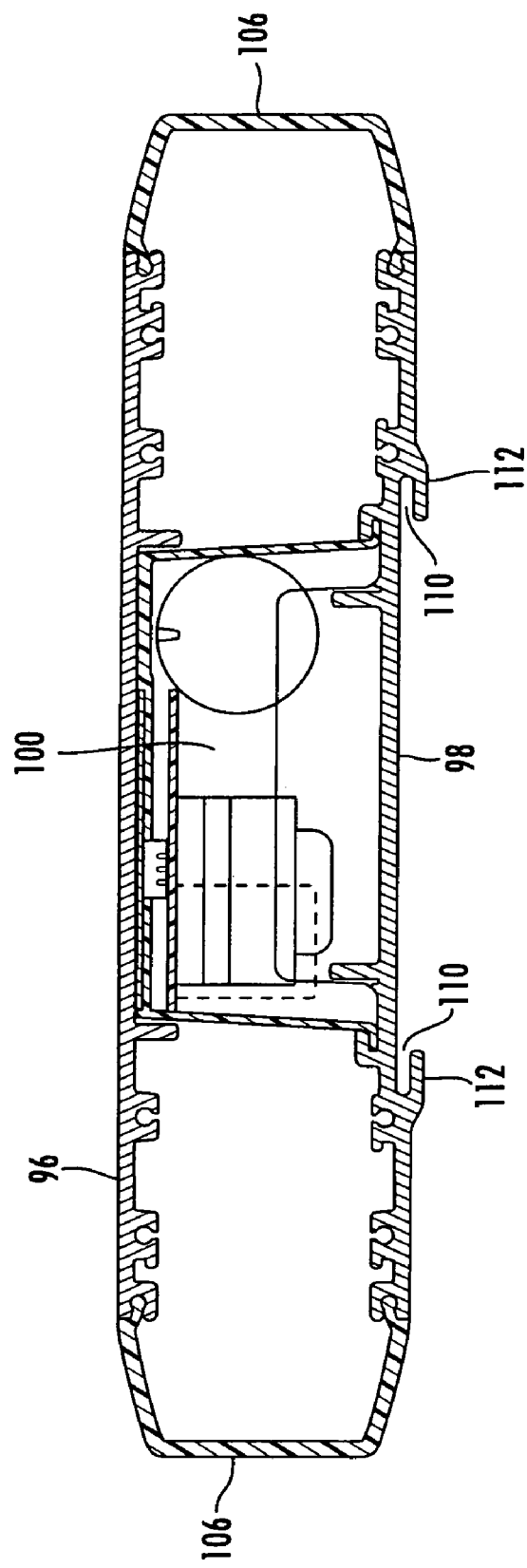
FIG. 14 is a sectional view through an assembled lightbar similar to that shown in FIG. 13.

FIG. 14 is an end sectional view through the assembled lightbar with light units omitted for clarity. Installation of the end caps 106 covers the ends of the mounting foot slots 110 at either longitudinal end of the lower extruded member 98. When the mounting foot assembly 10 is assembled to the lightbar, the tabs 34 on the support platform 18 of the base 12, and the lateral ends 83 of the crossbar portion 82 of the bracket 80, are received within the slots 110 of the lower extruded member 98 defined by longitudinally extending lips 112.

In assembling the mounting foot assembly 10 to the light bar, the rounded configuration of the diagonally opposite corners 38, as well as the fact that the length "L" of the upper planar section 24 of the base 12 is less than the distance between the lips 112, allows the tabs 34 on the support platform of the base 12 to be received between the longitudinally extending lips 112 of the lower extrusion 98 when the base 12 is positioned at an angle of approximately 70° to 90° relative to its installed position in the extrusion 98. Once the support platform 18 of the base 12 is received against the lower extrusion 98 at this angular orientation, the base 12 is then rotated such that the longitudinal axis "A" of the mounting foot assembly becomes parallel to the longitudinal extent of the lightbar. This rotation of the mounting foot assembly 10 fully engages the tabs 34 and the lateral ends 83 of the crossbar portion 82 of the light bracket 80 in their respective mounting foot slots 110, with the lips 112 of the extrusion positioned in the slots 36 on the support platform 18 of the base 12.

When the base 12 is in its installed position relative to the extrusion 98, the set screws 94 in the bosses 92 in the crossbar portion 82 of the bracket 80 of may be tighten to engage the lower surface of the lightbar extrusion 98. Upon tightening, the set screws 94 push the crossbar portion 82 of the bracket 80 away from the lower surface of the extrusion 96 thereby forcing the lateral ends 83 of the crossbar portion 82 and the support platform tabs 34 against the lips 112 of the mounting foot slots 110. Thus, the base 12 of the mounting foot assembly 10 is securely frictionally engaged with the lightbar extrusion 96. In this case, the crossbar portion 82 of the bracket 80 serves as a retaining bar for securing the base 12 to the lightbar extrusion 96 as well as for mounting a side light.

Figure 15:
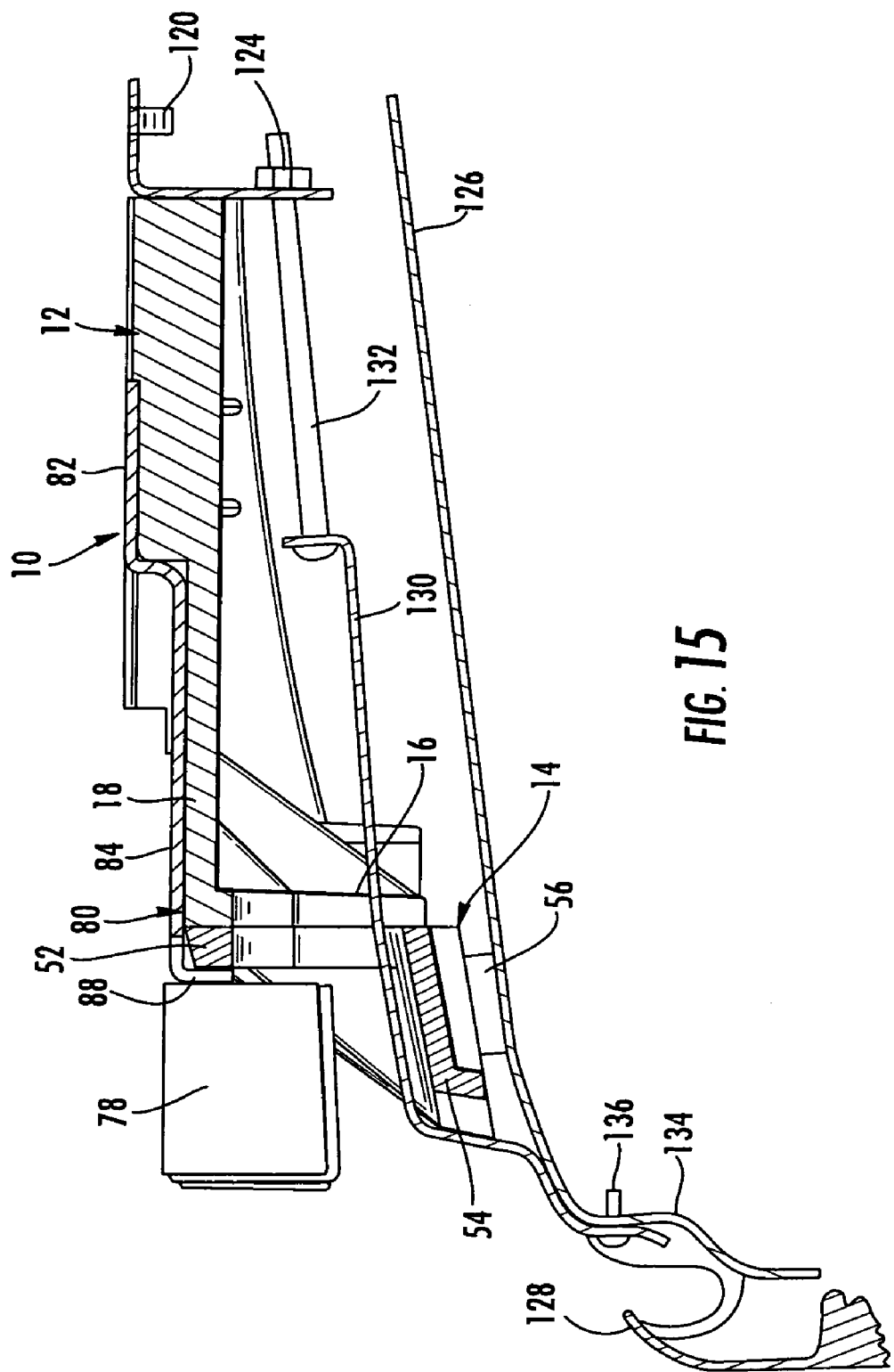
FIG. 15 is a sectional view through a representative installation on a vehicle of the mounting foot assembly and bracket of FIG. 10.

As shown in FIG. 15, engagement of the base 12 to the lightbar may be supplemented by a blocking bar 116 that serves to prevent the base 12 of the mounting foot assembly from rotating counter clockwise in a manner that would permit the lightbar to disengage from the base 12. An exemplary blocking bar 116 is a laterally extending bent metal (angle) bracket configured to be installed against the rear end face of the support platform 18 of the base 12 to block rotation of the base 12 relative to the extrusion 98. The projection 30 from the rear of the support platform 18 is arranged to fit in a notch (not shown) in the blocking bar 116. During installation, the base 12 of the mounting foot assembly 10 is positioned and secured in place using the set screws 94. Lateral ends of the blocking bar 116 are then engaged in the respective mounting foot slots 110 and the blocking bar 116 is slidably moved into place against the rear end of the support platform 18 of the base 12 with the projection 30 fitting into the notch in the blocking bar 116.

The blocking bar 116 includes threaded bores 118 for reception of set screws 120. The set screws 120 threadably engage the bores 118 of the blocking bar 30 and bear against the extrusion 98 to set up a frictional engagement between the blocking bar 30 and the extrusion 40 quite similar to that established between the crossbar portion 82 of the bracket 80 and the extrusion 98. A downwardly extending portion 122 of the blocking bar 116 defines a square opening for a self-retained nut 124.

FIG. 15 is a sectional view through a representative installation for the mounting foot assembly 10. One mounting foot assembly 10 is shown mounted to the roof 126 of a service vehicle. To the left of the Figure, the roof slopes toward the door 128. As previously discussed, the foot member 14 of the mounting foot assembly 10 is configured to partially accommodate the slope of the roof. A mounting strap 130 is secured to the blocking bar 116 by a machine screw 132 threadably engaged with the self-retained nut 124. The mounting strap 130 passes over a central portion of the base portion 50 of the foot member 14 and is secured to the door jamb 134 of the motor vehicle by a fastener 38.

With a lightbar positioned on the roof 126 of the vehicle and before the mounting strap is tightened, the angular position of the light bar about its longitudinal axis may be adjusted to aim the lights forward and backward at the proper angle. This may be accomplished by loosening the bolts 72 securing the foot member 14 to the base 12. Due to the clearance between the bolts 72 and the elongated slots 54 in the rear wall 52 of the foot member 14 through which the bolts extend, there is enough room for the bolts 72 to move so that the base 12 with the lightbar attached thereto can be rotated about the longitudinal axis of the foot assembly 10. When the lightbar has been rotated about it longitudinal axis to the point where the lights are properly aimed, the bolts may be tightened to secure the base 12 to the foot member 14.

With the lights properly aimed, and the foot member 14 secured to the base 12, the machine screw 132 may be tightened to draw the mounting strap 130 tight over the base foot member 14 to compress the foot pads 56 against the roof 126 of the vehicle. The foot pads 56 conform to the slope of the roof 104 as shown in FIG. 15. The outward and downward force exerted by the mounting strap 46 retains the light bar securely on the roof 104.

While FIG. 15 illustrates an installation that does not pierce the roof 126 of the vehicle, other installations arrangements are possible. One alternative "permanent" installation may use fasteners passing through openings in the base member 50 of the foot member 14 and the foot pads 56 to directly engage the roof 104.

With the above-described embodiments, a mounting foot assembly 10 is provided which permits adjustment of the attached lightbar about its longitudinal axis, as well as vertically. Additionally, the mounting foot assembly 10 may include a bracket 80 on which an alley light can be mounted and which has a portion 82 which serves as a retaining bar to provide for the frictional engagement of the base of the mount foot assembly and the light bar. If an alley light is not desired, the bracket 80 may be omitted and a retaining bar having the shape of the crossbar portion 82 of the bracket 80 may be used in its place.

While preferred embodiments have been shown and described, various modifications and substitutions may be made thereto. Accordingly, it is understood that the present embodiments have been described by way of illustration and not limitation.

What is claimed is:

1. A mounting foot assembly for supporting on a supporting structure an elongate member having spaced parallel channels therein each said channel defining a slot, said slots of said channel being in facing relationship, said mounting foot assembly comprising:
   a base including a support platform and a front wall with a front surface extending downward from said platform, said support platform having tabs thereon adapted to be received in said slots, and
   a foot member including a base portion for supporting engagement with said supporting structure and a rear wall with a rear surface extending upwardly from said base portion, said foot member being adjustably secured to said base with said rear surface of said rear wall of said foot member being in facing relationship with said front surface of said front wall of said base whereby the angular position of said base relative to said foot member about an longitudinal axis of said mounting foot assembly may be varied.

2. The mounting foot assembly of claim 1 wherein said base is adjustable vertically with respect to said foot member.

3. The mounting foot assembly of claim 2 further including a bracket, said bracket having a first portion received within a cross channel in the upper surface of said support platform, a second portion extending forwardly to the to the rear wall of said foot member, and at least one down turned flange extending downwardly from said second portion in front of said rear wall of said foot member, said at least one flange adapted for having a light assembly attached thereto.

4. The mounting foot assembly of claim 3 wherein said rear wall of said foot member and said front wall of said base member have cutouts therein.

5. A mounting foot assembly for supporting an elongate member having spaced parallel channels therein, each said channel defining a slot, said slots of said channel being in facing relationship, said mounting foot assembly comprising:
   a base including a support platform with an upper surface and a front wall with a front surface extending downward from said platform, said support platform having tabs thereon adapted to be received in said slots;
   a foot member including a base portion and a rear wall with a rear surface extending upwardly from said base portion, said foot member being operatively secured to said base with said rear surface of said rear wall of said foot member being in facing relationship with said front surface of said front wall of said base ; and
   a bracket having a first portion received within a cross channel in the upper surface of said support platform, a second portion extending forwardly to the rear wall of said foot member, and at least one down turned flange extending downwardly from said second portion in front of said rear wall of said foot member and adapted for having a light assembly attached thereto.

6. The mounting foot assembly of claim 5 wherein there are two spaced down turned flanges extending downwardly from said second portion in front of said rear wall of said foot member.

7. The mounting foot assembly of claim 5 wherein said cross channel extends laterally across said support platform and interrupts said tabs, said first portion of said bracket having its ends adapted to be positioned in said slots.

8. The mounting foot assembly of claim 7 wherein said bracket is provided with downwardly extending threaded bosses, said bottom surface of said cross channel having bores therein aligned to receive said internally threaded bosses, and a fastener positioned in each of said threaded bores.

9. The mounting foot assembly of claim 8 wherein said fastener is a set screw adapted be tightened against said elongate member when said support platform is received in said slots.

10. A mounting foot assembly for supporting an elongate member having spaced parallel channels therein, each said channel defining a slot, said slots of said channel being in facing relationship, said mounting foot assembly comprising:

a base including a support platform and a front wall with a front surface extending downward from said platform, said support platform having tabs thereon adapted to be received in said slots, and a foot member including a base portion and a rear wall with a rear surface extending upwardly from said base portion, said foot member being adjustably secured to said base with said rear surface of said rear wall of said foot member being in facing relationship with said front surface of said front wall of said base whereby the angular position of said base relative to said foot member about an longitudinal axis of said mounting foot assembly may be varied and said base is adjustable vertically with respect to said foot member. said rear wall of said foot member including two spaced vertically elongated slots and said front wall of said base including two bores complementary to said slots, and a fastener extending through each of said slots in said base portion and into said bore in said front wall to secure the foot member to said base.

11. The mounting foot assembly of claim 10 wherein each said fastener includes a bolt extending through said slot into said bore in said base and a nut positioned rearward of said bore, said bolt extending into said nut in threaded engagement therewith whereby said bolt can be tightened to secure said foot member to said base.

12. The mounting foot assembly of claim 11 wherein each said bolt is of a diameter less than the width of its respective said slot so that when said fasteners are loosened, said base will have lateral play relative to said foot member and said base can be rotated about the longitudinal axis of said foot assembly with respect to said foot member.

13. The mounting foot assembly of claim 12 wherein each said nut is positioned in said base member in a manner to prevent rotation.

14. The mounting foot assembly of claim 13 wherein said base includes a vertically extending channel communicating with each of said bores, each said channel forming a pocket for the reception of said nut, said pocket being configured to position the nut coaxial with the bore and prevent rotation thereof.

15. The mounting foot assembly of claim 14 wherein said base includes vertically extending ribs positioned behind said front wall adjacent both edges thereof, said vertically extending channels positioned within said ribs.

16. The mounting foot assembly of claim 15 wherein a locking washer is mounted on each fastener between said front wall of said base and said rear wall of said foot member.

17. The mounting foot assembly of claim 15 wherein said base portion of said foot member has resilient foot pads extending from its bottom surface.

18. The mounting foot assembly of claim 10 further including a bracket, said bracket having a first portion received within a cross channel in the upper surface of said support platform, a second portion extending forwardly to the to the rear wall of said foot member, and at least one down turned flange extending downwardly from said second portion in front of said rear wall of said foot member, said at least one flange adapted for having a light assembly attached thereto.

19. The mounting foot assembly of claim 18 wherein said rear wall of said foot member and said front wall of said base member have cutouts therein.

* * * * *